May 25, 1948.   C. MOTT ET AL   2,442,013
SPEED CONTROL FOR MOTIVE DEVICES
Filed March 7, 1942   4 Sheets-Sheet 2

INVENTOR
CHESTER MOTT
ALFRED F. CHOUINARD
ROBERT L. HARDING
BY
ATTORNEYS

May 25, 1948.  C. MOTT ET AL  2,442,013
SPEED CONTROL FOR MOTIVE DEVICES
Filed March 7, 1942  4 Sheets-Sheet 3
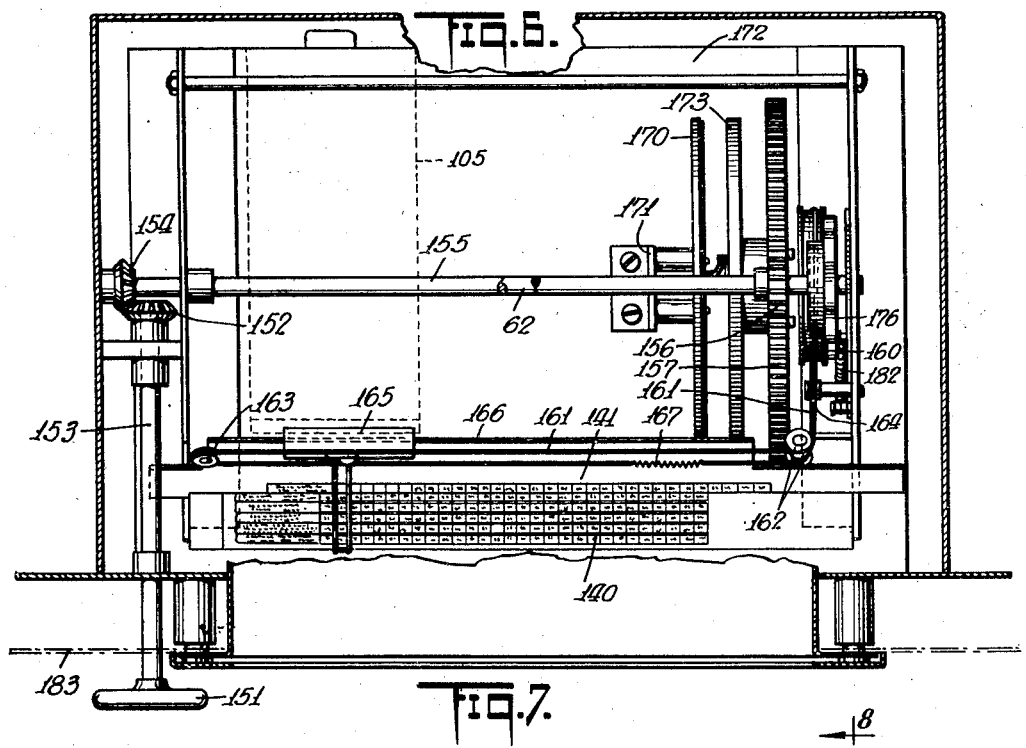
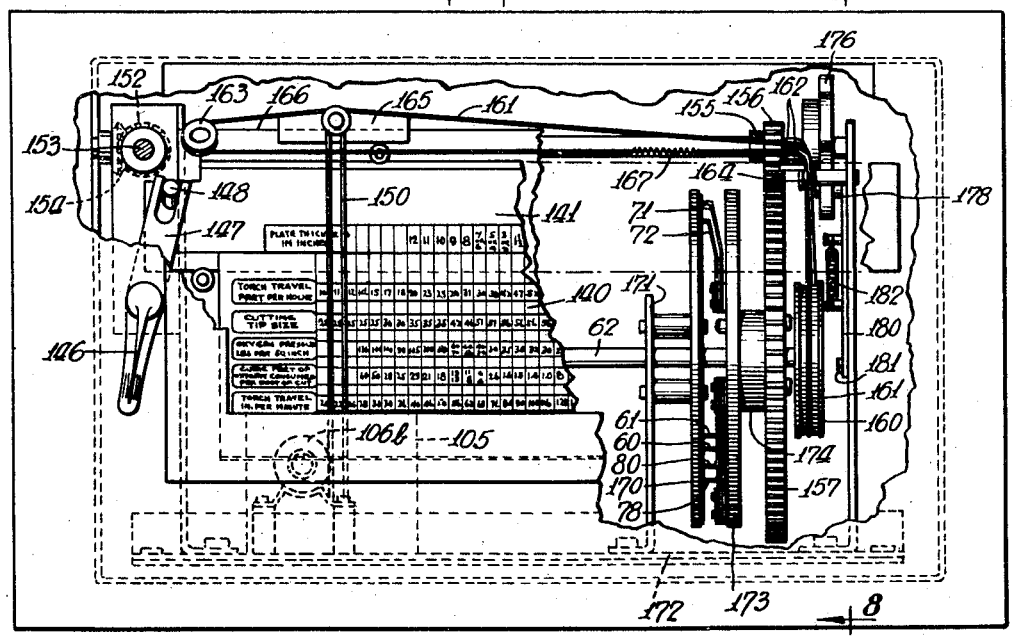
INVENTOR
CHESTER MOTT
ALFRED F. CHOUINARD
ROBERT L. HARDING
BY
Dean Fairbanks & Hirsch
ATTORNEYS Patented May 25, 1948

2,442,013

UNITED STATES PATENT OFFICE 2,442,013

SPEED CONTROL FOR MOTIVE DEVICES

Chester Mott, Evanston, and Alfred F. Chouinard and Robert L. Harding, Chicago, Ill., assignors to National Cylinder Gas Company, Chicago, Ill., a corporation of Delaware Application March 7, 1942, Serial No. 433,780

9 Claims. (Cl. 318—331)

1

The present invention relates broadly to speed controls for motive devices, such as electric motors, hydraulic motors and air-driven motors, and more particularly to the use of such controls in torch cutting machines to control the rate of cutting.

Among the objects of the present invention is to provide a new and improved speed control device which (1) will operate through a wide range of speeds, (2) can be operated with extreme accuracy and within extremely narrow limits of speed variations at any selected speed, (3) permits infinite gradual changes in speeds within a predetermined range or fixed step - by - step changes arranged in any desired series within said range, (4) permits quick changes in speed setting whether the controlled motive device is operating or not, (5) permits positioning of the control device either near the motive device to be controlled or remote therefrom, (6) maintains constancy in speed setting, so that at any selected setting the motive device will always operate at a definite originally adjusted speed determined by that setting, (7) utilizes such minute currents that the component parts of the control device do not gradually deteriorate sufficiently to affect the operation of said device, and employs a thermionic valve or governor which deteriorates relatively suddenly, thereby making the necessity for replacement of said valve immediately apparent, (8) permits the stationary parts of the control device to form a self-contained unit which can be electrically and mechanically connected to or disconnected from the movably controlled parts with ease and without the necessity of any skill, (9) can be easily attached to any existing motive device to be controlled, (10) can be calibrated and operated to correlate any particular data with any particular speed setting, (11) allows the controlled motive device to deliver a torque at reduced speeds equal to its torque at maximum speed, and (12) is simple, comparatively inexpensive to manufacture and occupies a minimum amount of space.

In torch cutting machines, it is common practice to mount the oxy-acetylene cutting torch on a carriage, and to propel both the carriage and the torch along the carriage by an electric motor, which drives a traction wheel having guided movement in accordance with the path which it is desired to have the torch follow. For any given thickness of plate of given composition, the rate of travel of the torch should be constant, but the speed of travel must be different for plates of different thicknesses. Plates to be cut may vary

2 from one-eighth of an inch or less to twelve inches or more in thickness. In practice the rate of travel of the torch is not varied directly as the plate thickness, because the cut is necessarily wider for a thick plate than for a thin one, and it is common practice to use a larger tip size and a higher cutting oxygen pressure for thicker plates than for thin ones. Thus for a twelve-inch plate the rate of torch travel may be about one-seventh the rate of travel for a one-eighth inch plate because of the necessity of delivering a larger volume of oxygen per unit of time, or per unit of plate area to be cut. Having determined the tip size and oxygen pressure needed for a plate of a given thickness, there is a definite speed of travel which should be imparted to the torch, and that speed should be kept constant. If it be too fast, the cut will not be completely through the plate; if it is too slow, an excessive amount of metal will be burned away, and the cut will be too wide; and if the speed varies, the cut will be irregular in width and the cut may be incomplete in places.

Another object is to provide a control device of the type referred to for controlling the speed of the electric motor of the drive unit of a torch cutting machine to regulate the speed of cutting.

Various other objects, features and advantages of the invention will be apparent from the following particular description, and from an inspection of the accompanying drawings, in which Fig. 1 is a somewhat simplified schematic diagram of a system incorporating the features of the present invention, and showing the means by which the speed of a motive device, as for instance a direct current motor, can be selectively controlled and changed, this system being shown with an alternating current generator for generating controlling voltage.

Fig. 4 is a perspective view somewhat diagrammatic showing a torch cutting machine in corporating the control features of the present invention.

Fig. 5 is a vertical somewhat schematic section of the torch cutting machine taken through the drive unit of said machine, and shown with the outer casing removed.

Fig. 6 is a horizontal section taken through the part of the torch cutting machine containing the motor speed control.

Fig. 7 is a front elevation of the part of the torch cutting machine containing the motor speed control, portions of the frame structure being shown broken away to reveal certain movable parts of said control.

In carrying out the features of the present invention, power, as for example, electric current, is supplied to a motive device, such as an electric motor 10, for a period of time long enough to bring said motor to the desired speed of rotation. As soon as this motor 10 exceeds this speed, this current is automatically interrupted to cause said motor to slow down. When the motor 10 is slowed down below a certain speed, current flow to the motor is automatically reestablished, so that the motor is again speeded up to the desired value. This cycle is repeated as long as the motor speed exceeds a maximum limit, and drops below a minimum limit. By making these two extreme operating limits narrow enough for any speed setting, the motor 10 can be made to operate with extreme accuracy and constancy at any selected speed.

Figure 1:
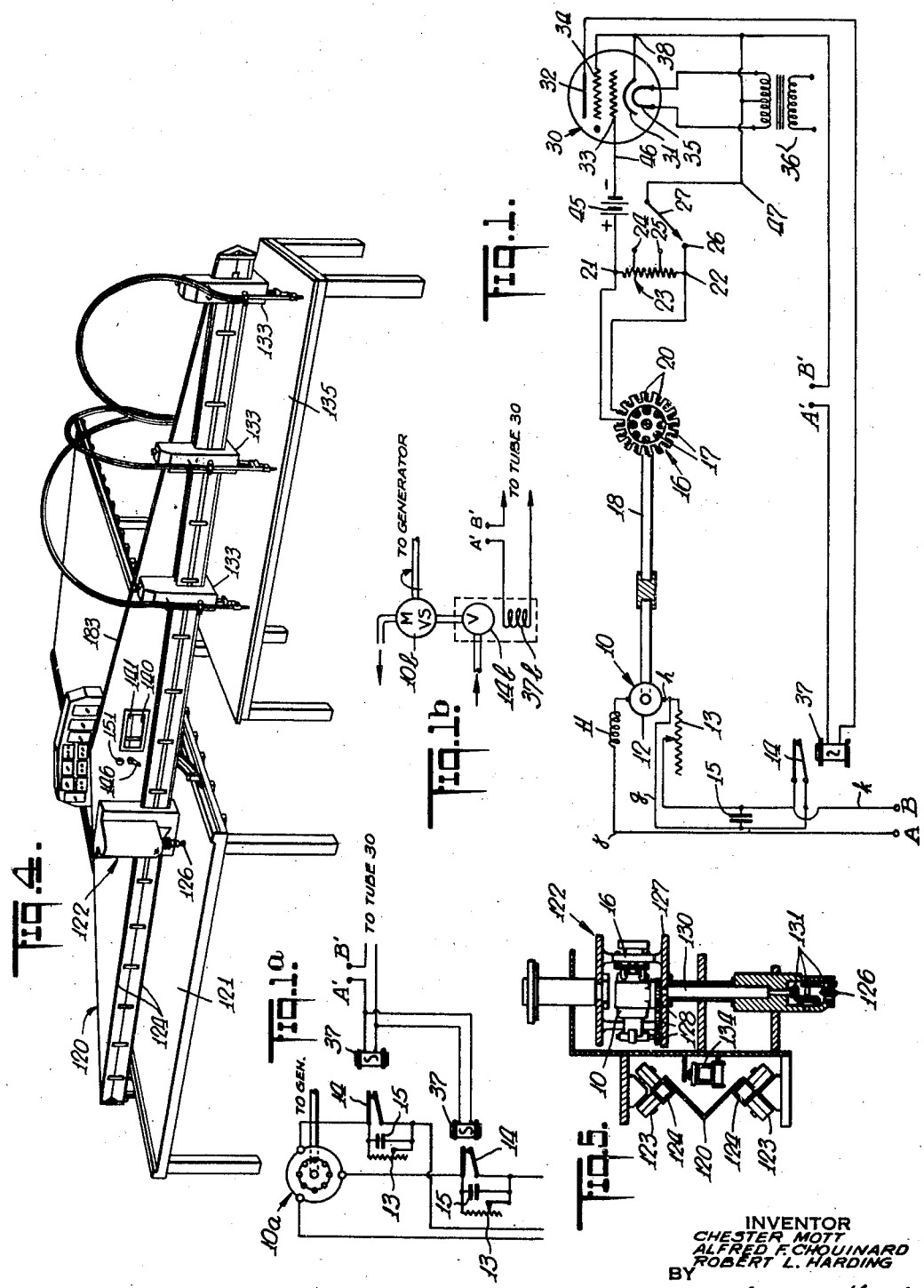
Fig. 1a is a portion of a somewhat simplified schematic diagram of a system similar to that shown in Fig. 1, but showing the motor to be controlled, as for instance of the three phase type.
Fig. 1b is a portion of a somewhat simplified schematic diagram of a system similar to that shown in Fig. 1, but showing the motor to be controlled, as for instance of the hydraulic type.

In Fig. 1 is shown a simplified diagram of the manner in which the speed of the motor 10 can be controlled, the different parts being shown disproportionate for the sake of clarity. The motor 10 is supplied with current from the mains A, B, and is shown of the direct current type with a field coil 11 and an armature 12, although it may also be of the alternating current type. Connected in series with this motor 10 are a variable resistance 13 and a relay switch 14, the switch and resistance being in parallel so that the resistance is cut out when the switch is opened. This relay switch 14 is needed for reducing or increasing the flow of current to said motor when said motor reaches maximum and minimum speed limits for any setting of the controls. The resistor 13, in conjunction with the condenser 15 performs the basic function of eliminating arcing at the contacts of relay switch 14. While the resistor 13 tends to establish a minimum speed of the motor when the relay switch 14 is open, this action is not intentional and is reduced by making resistor 13 variable to obtain a compromise between this minimum speed tendency and the maximum arcing suppression; or resistor 13 can be open-circuited to entirely eliminate said tendency, with a consequent shortening of switch contact life. The percentage of arc suppression, due to RC constant (resistance in ohms multiplied by capacitance in farads) established by the condenser 15 and the resistor 13, approaches 100% with a decrease in resistor 13 up to a limit depending upon the motor speed. On the other hand, the minimum motor speed decreases with an increase in resistance at 13 to a point where the current flowing through the resistor is not of sufficient value to operate the motor. Removing said resistor 13, leaving the circuit open at this point, has the same effect as increasing the resistance to an infinite value. The motor armature 12 is mechanically coupled to a self-excited generator 16 either by direct connection as shown or by a belt or gear drive. When the switch 14 is closed, as shown in Fig. 1, the current flows from B through 14, wire $g$ to point $h$ and through 10, 11 and wire $j$ back to A. When the switch 14 is open, current flows from B along wire $k$, and a portion of resistance 13 to point $h$ and thence through 10, 11 and $j$ back to A.

Although this generator 16 is shown comparatively large in the simplified diagram of Fig. 1, in actual practice this generator is comparatively small in size and electrical capacity, so that there is little or no loss of energy or slippage between the motor 10 and said generator, even if the two are belt connected.

Either an alternating current or a direct current generator may be used. The direct current generator may be one in which magnetic lines of force generated either by a field coil connected across its armature, or by a permanent magnet are cut by the rotating armature to generate direct current voltage. In the specific form shown, the generator 16 is of the alternating current self-excited type, and has a plurality of permanent magnets 17 (eight being shown) mounted for rotation with the armature shaft 18, and a plurality of coils 20 (sixteen being shown) connected together in series and mounted on a stator, the alternating current generated in said coils being available at points 21 and 22.

The generated voltage available at points 21 and 22 varies directly with the speed of the generator armature, and this armature speed in turn is equal to the speed of the motor 10. It is therefore a simple matter to calculate the output peak voltage of the generator 16 at the points 21 and 22 at any speed once the maximum voltage at maximum speed is known.

Connected across the two points 21 and 22 in the output generator circuit is a resistor 23 having taps 24, 25 and 26 affording current at different voltages in accordance with the setting of a slider 27. Although three taps are shown on the resistor 23 to simplify explanation of the diagram of Fig. 1, it must be understood that the number of resistor taps depends on the number of different speed settings desired. The resistor 23 may, if desired, be of the continuously variable type to allow for an infinite number of settings of the slider 27 which acts with the resistor as a selective potential divider.

The control voltage selected by the setting of the slider 27 is impressed on a thermionic valve or governor 30, to control the operation of the relay switch 14 in the motor circuit. This valve 30 is shown as a hot cathode gas tetrode having a cathode 31, an anode 32, a control grid 33 between said cathode and said anode, and a screen grid 34 serving as a shield between said control grid and said anode, and also serving to reduce the interelectrode capacity within the tube. A filament 35 in the tube connected across the secondary coil of a transformer 36 serves to warm the cathode 31, so that said cathode emits electrons having a negative charge. The anode 32 has a positive potential connected to it, so that the electrons emitted by the cathode 31 will be attracted to said anode. Once this electron flow is created between the cathode 31 and the anode 32, a conductive circuit is established through the tube between these electrodes. A relay coil 37 controlling the switch 14 is connected to the circuit of the tube electrodes 31 and 32, so that when electron flow is established in the tube 30 between these electrodes, current will flow from main A' through relay coil 37 to anode 32, across the conductive path provided by the electron flow to cathode 31, to point 38 and then to the main B'.

The grid 33 controls the electron flow passing therethrough. If this control grid 33 is sufficiently negative in potential, it will repel the negative electrons from the cathode 31. Any slight change below or above the critical potential of control grid 33 will act as a governing device for the flow or stoppage of flow of the electrons reaching anode 32. The tube 30 in the specific form shown is gas-filled, and designed for sharp cut-off features, so that once an electron flow is established between cathode 31 and anode 32, the gas in the tube becomes ionized, and provides a greater conducting path and a larger number of free electrons than can be supplied by the hot cathode 31 alone. Furthermore, with this type of tube, at a certain value of potential on the anode 32, there is established a certain critical potential for the control grid 33, at which value the tube becomes conductive.

Another characteristic of these gas-filled tubes is that once plate current (i. e., electron flow) is established, the grid 33 will not regain control by becoming more negative as long as there is a positive potential applied to anode plate 32. Consequently, the only way in which control may be returned to the grid 33 is by removing or reducing the potential at the anode 32. This is accomplished by applying at mains A', B' a source of alternating current, so that control is returned to the grid 33 sixty times a second, assuming that the current applied at these mains is sixty cycles.

A small battery 45 connected to the control grid lead 46 provides a potential just sufficiently negative to prevent the tube 30 from firing (i. e., establishing electron flow) when no voltage is impressed at points 21 and 22 from the generator 16. A battery potential of approximately three volts is sufficient for that purpose, and serves to prevent any current flow in the anode circuit when the generator 16 is not rotated, so that the relay coil 37 in said circuit is deenergized and the switch 14 remains closed under spring action.

Upon rotation of the generator 16, a voltage generated thereby is impressed across points 21 and 22 of the resistor 23. With the slider 27 contacting tap point 26, the full generated voltage is applied across the tube input circuit at points 46 and 47. The negative side of the battery 45 is connected to the lead 46 of the control grid 33, so that when the voltage delivered by the generator 16 approaches the constant voltage of constant magnitude delivered by said battery, and while the potential at point 21 resulting from the voltage generated by the unit 16 is positive during each cycle, the net potential at that phase applied across the points 46 and 47 would be equal to the battery voltage minus the generated voltage. The net potential would be lower than the critical voltage, below which the tube 30 fires. As soon as there is a current flow in the anode circuit, relay coil 37 is energized and switch 14 is opened, so that current to the motor 10 is reduced and said motor slowed down. This causes a corresponding slowing down of the generator 16, so that the positive output potential at point 21 is decreased during each cycle of the generated voltage, and the net potential applied at the tube input terminals 46 and 47 is increased. When this generated output positive potential is low enough so that the battery 45 delivers an increasing share of the net controlling voltage applied at points 46 and 47, and when this net voltage becomes greater than the critical firing voltage required by tube 30, then the tube is extinguished (i. e., is prevented from carrying anode current through relay coil 37). Thus the switch 14 is closed and maximum current flow to the motor 10 reestablished. This causes the generator 16 to speed up until the net voltage at points 46 and 47 is again below the critical firing point of the tube 30. The original cycle of operation is then repeated.

The alternating current generated by the unit 16 varies in frequency according to the armature speed of said unit. With eight magnets rotating with the armature shaft, the frequency of the generated current will be equal to eight cycles for every revolution per second. Assuming that the minimum operating speed of the motor 10 is 500 R. P. M. or 8.33 revolutions per second, the frequency of the generated current at this minimum speed is about 66 cycles per second. With an alternating current generator 16, there results an opposition to the battery current only during the positive half of the cycle. Even at the slowest frequency generated of about 66 cycles per second, this frequency will be greater than the frequency (60 times per second) at which control is restored to the control grid 33 by the alternating current at the mains A', B'. The maximum lag in control is, therefore, no greater than $1/60$ of a second when 60 cycles current is employed at the mains A', B'. Therefore, as far as the degree of accuracy in control is concerned, it does not matter whether there is a D. C. or an A. C. potential applied to the control grid 33.

The tube 30 is fired or operated at one particular potential applied at its input terminals 46 and 47 irrespective of the total voltage generated by the unit 16 and made available at the points 21 and 22. Therefore, to obtain any control speed for the motor 10, the slider 27 is moved into position to contact any one of the tapped resistor points 24, 25 or 26. Since the potential between the point 21 and the slider 27 is equal to the potential applied to input terminals 46 and 47 of the tube 30, in order to obtain a tube firing potential at these terminals, it is necessary for the generator 16 to generate a much greater total voltage, so that the motor 10 must rotate at a greater speed, which speed is selected and determined by the setting of the slider 27.

As an example, assuming that the tube 30 is so designed that it will not conduct current in the anode circuit when a negative voltage of three volts is applied to the control grid 33, but when a negative potential of two volts is applied to said control grid, the tube 30 will fire. Also, assuming that the peak generated voltage for a generator speed of 500 R. P. M. is one volt, for 5,000 R. P. M. ten volts, and for 10,000 R. P. M. twenty volts, then with the slider 27 contacting resistor tap 26, the output peak voltage of the generator 16 amounting to one volt when the generator speed reaches 500 R. P. M. will be applied to points 21 and 47. During the positive half of the cycle of the generated voltage, this one volt in opposition to the three volts delivered by the battery 45 will cause a negative potential of two volts to be applied to points 46, 47. At this instant the tube 30 becomes conductive, so that flow of anode current is established, the relay 37 becomes energized and the switch 14 opened. The subsequent cycle of operation is as previously described to maintain the speed of the motor 10 at about 500 R. P. M.

With the slider 27 in contact with the tap 25, and assuming that the resistance between points 21 and 25 is 1/10 of the total resistance between points 21 and 26, then to obtain a value of one volt between points 21 and 47 it would be necessary for the generator 16 to generate a total peak voltage of ten volts before the tube 30 fires. To obtain this total voltage, the generator 16 must have a speed of 5,000 R. P. M. The one volt available between the points 21 and 47 resulting from a generator speed of 5,000 R. P. M. will, when algebraically added to the battery voltage of three volts, result in a net potential of two volts necessary to fire the tube, so that the speed of the motor 10 is maintained at about 5,000 R. P. M.

Assuming that the resistance between points 21 and 24 is 1/20 of the total resistance between points 21 and 26, then when the slider 27 is set into contact with the tap 24, the voltage applied at points 21 and 47 is one volt when a total positive peak voltage of twenty volts is generated by the generator 16. To obtain this voltage, the generator 16 must be driven at 10,000 R. P. M. For a setting of the slider 27 into contact with the resistor tap 24, the tube 30 operates in a manner already described to maintain the motor 10 at approximately a speed of 10,000 R. P. M.

The values of voltages specified in the above examples are not to be considered as the ones necessarily used in a practical arrangement. The examples imply that the tube 30 will not fire at a potential of three volts and that it requires a full potential drop of one volt to fire the tube 30. As a matter of fact, the tube 30, in actual practice, can be operated on potential differences lower than 0.05 volt.

In Fig. 1a is shown a schematic simplified system in which the motor 10a whose speed is to be controlled is of the three phase type. In this construction there are provided two resistors 13 in two of the phase circuits respectively and two corresponding switches 14 controlled from two relays 37 respectively. In all other respects the system is similar to that shown in Fig. 1.

In Fig. 1b is shown a schematic simplified system in which the unit whose speed is to be controlled is a hydraulic variable speed motor 10b coupled to a generator (not shown). A solenoid valve 14b either on the inlet or outlet side of the motor 10b according to the nature of the motor, controls the flow of actuating hydraulic fluid to said motor and thereby controls the speed of said motor. This valve 14b is controlled by the solenoid 37b in the circuit of the thermionic tube 30 in a manner already described with reference to the system of Fig. 1. In all other respects the system of Fig. 1b is similar to that shown in Fig. 1.

As far as certain aspects of the invention are concerned, the unit whose speed is to be controlled may be a pump, a turbine, or other unit actuated by a flowable power agency.

Figure 2:
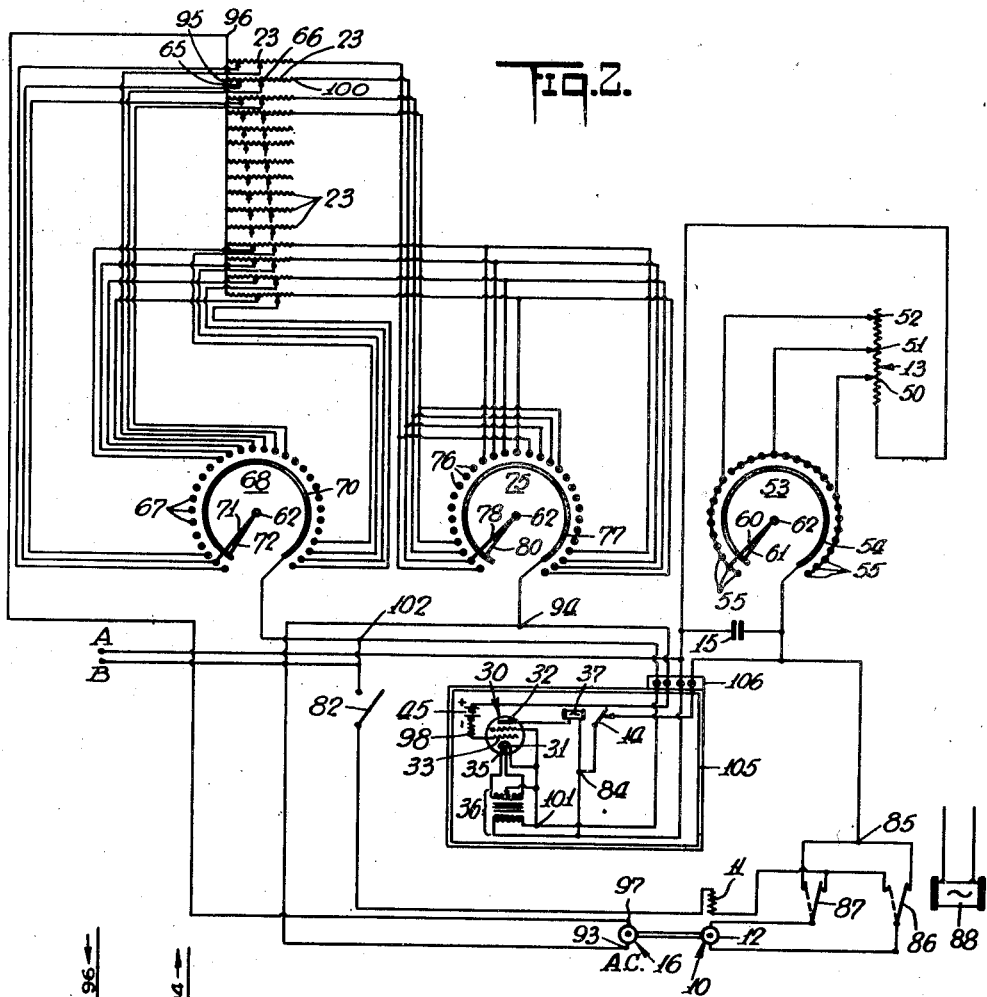
Fig. 2 is a more complete wiring diagram of the system shown in Fig. 1.

In Fig. 2 is shown a more complete wiring diagram of the speed control system shown in Fig. 1. In this system, the resistance 13 in the motor circuit reduces the voltage applied to the motor 10 when relay switch 14 is opened and thereby reduces the speed of said motor. This resistance 13 is shown tapped at three points 50, 51 and 52 to afford three values of resistance for the entire speed range of the motor 10, these values being picked by a rotary selector 53 comprising a contact ring 54, contacts 55 arranged and electrically interconnected into three series having electrical connections to the respective tapped resistance points 50, 51 and 52, and a pair of contact arms 60 and 61 connected to a shaft 62 and slidable over said contacts and said ring respectively. With this arrangement, the motor 10 for any speed setting will have one of three optimum speeds lower than the selected speed when relay switch 14 is opened, but when the relay switch 14 is closed, full voltage is applied to the motor 10 and said motor tends to over-travel this selected speed. This is necessary to enable the motor 10 to operate between the tolerance limits determined by the control circuit. This arrangement also serves to "over-voltage" the motor 10 in order to supply any added torque when said motor is overloaded. The resistor 13, in combination with the condenser 15, performs the additional function of eliminating arcing at the contacts of relay switch 14.

The control is shown in Fig. 2 with thirty speed settings. The use of one resistor 23 for all of these speed settings would be impractical, since it would be necessary for this resistor to be extremely long in order to maintain thirty taps thereon corresponding to these settings. For that purpose, there are provided fifteen resistors 23, each being utilized for two speed settings by tapping each resistor at two points 65 and 66, and connecting all thirty of these points to respective contacts 67 on the rotary selector 68. This selector 68 has a contact ring 70 and a pair of radial contact arms 71 and 72 slidable over said contacts and said ring respectively, and connected to the shaft 62 for rotation in unison with the contact arms 60 and 61 on the motor ballast selector 53.

For connecting into the control circuit the conductor leading to the resistor 23 picked by the selector 68, there is employed a third selector 75 having a contact ring 77 and a series of contacts 76 corresponding in number to the contacts 67 on the selector 68. A pair of radial contact arms 78 and 80 connected to shaft 62 slide over contacts 76 and ring 77 respectively.

The three selectors 53, 68 and 75 are operated in unison by rotation of the shaft 62, and are shown in Fig. 2 set into second motor speed position. In the operation of the system, alternating current supplied at mains A, B will flow from line A to the primary coil of the transformer 36, so that the tube filament 35 is heated, and the tube made ready for operation. When the switch 82 is closed, current will flow from main A to point 84, through motor relay switch 14 in closed position shown to point 85. From this point, the current continues through relay switch 86 in full line position shown, through motor armature 12, through relay switch 87 in full line position shown, and through the motor field 11 to main B. The switches 86 and 87 are operated in unison from a relay coil 88 into full or dotted line positions indicated in accordance with the desired direction of rotation of the motor 10.

With the generator 16 coupled to the motor 10, current during the position half of each cycle flows from terminal 93 to point 94, through contact ring 77, through slide contact arms 80 and 78 to the second selected contact 76, through the corresponding resistor 23 to points 95 and 96, and to the other terminal 97 of the generator 16, From point 94, current also flows towards the positive side of the battery 45 to buck the voltage of this battery, the negative side of the battery being connected through a grid current limiting resistor 98 to the control grid 33. The lower potential terminal for this bucking voltage is at point 65 on the selected resistor 23.

A fraction of the total voltage generated by the generator 16 and existing between the point 100 and 65 on the selected resistor 23, is applied between the terminals of the cathode 31 and the control grid 33. For that purpose, the circuit to the cathode 31 follows from point 65 to the second selected contact 67 on the selector 68, through the contact arms 71 and 72, through the contact ring 70 to point 101, and then to said cathode.

The voltage applied to the tube 30 between the terminals of the control grid 33 and the cathode 31 gradually increases the faster the generator 16 rotates. As soon as this voltage is high enough to buck the battery voltage which prevents the tube from firing, this tube will fire and become conductive, so that current will flow from the main A to point 84, through the relay 37 to the anode 32, through the electron stream to the cathode 31, to points 101 and 102 to the main B. With the relay 37 energized, the switch 14 is opened, so that current flow to the motor 10 is reduced. This causes the motor to slow down, so that the generator also slows down, and the voltage impressed on the tube 30 gradually decreased. When this generated voltage becomes low enough so that the battery 45 again gains control, the tube 30 is extinguished, plate current interrupted, and the relay 37 deenergized, so that the switch 14 is reclosed and the motor speeded up again. This cycle is repeated often enough, so that the average speed of the motor remains within an extremely narrow range of speeds.

The tube 30, the battery 45, transformer 36, switch 14 and the relay 37 are desirably mounted and enclosed in a cartridge 105, to form a self-contained replaceable unit, which can be easily connected to or disconnected from the rest of the control system. To facilitate this connection or disconnection, the cartridge 105 is provided with a disconnect plug and socket 106 by which various conductors from the system outside of the cartridge may be plugged into electrical contact with the elements in said cartridge.

Figure 3:
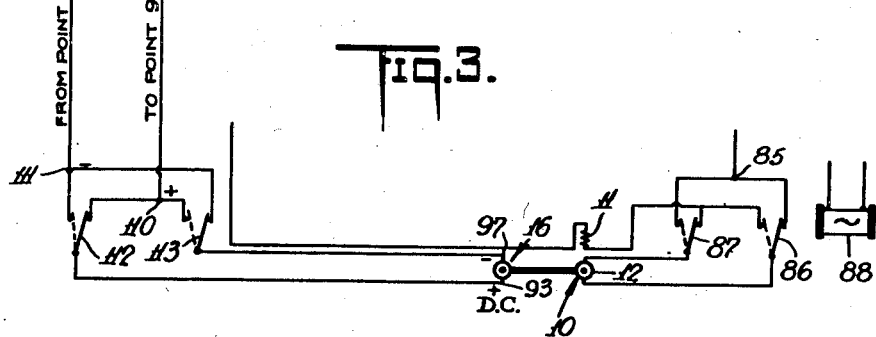
Fig. 3 is a portion of the wiring diagram of a system employed when the generator for generating controlling voltage is of the direct current type.

In Fig. 3 is shown a portion of the wiring diagram when the generator 16 is of the D. C. type. In this diagram, point 110 must always have a positive potential applied to it, and point 111 must always have a negative potential. The D. C. generator 16 (Fig. 3) reverses its polarities from those indicated at points 93 and 97 when its rotation is reversed in direction. Therefore, in order to provide for this change in direction of the generator without reversing the polarity of the points 110 and 111, there is provided a pair of switches 112 and 113. These switches 112 and 113 are controlled from the relay 88 in unison with the switches 86 and 87, so that when the direction of the motor 10 is reversed, the switches 112 and 113 will be moved into position to maintain the proper polarity indicated for points 110 and 111.

As a feature of the present invention, the motor speed control shown and described is employed in a torch cutting machine to control the rate of cutting. As an example of the type of torch cutting machine in which the present invention may be employed, there is shown somewhat schematically in Figs. 4 and 5 a cutting apparatus having a carriage 120, which travels horizontally on rails over a table 121, on which may be supported a templet, drawing, pattern or other guide. A drive unit 122, which may be of any well-known type, or which may be of the form shown and claimed in Patent 2,336,626, issued on copending application Serial No. 395,616, is supported on carriage 120 for horizontal movement therealong crosswise of the movement of said carriage. This drive unit 122 may, for instance, be supported for such movement along the carriage 120 by means of rollers 123 secured to the frame of the drive unit and engaging a pair of rails 124 on said carriage.

The drive unit 122 has a tracing element 126 in the form of a tracer wheel, pointer, spot of light or the like, which can be steered along the outline of the pattern or other guide to be copied or traced. This tracing element 126 may be in the form of a traction wheel driven from the electric motor 10 forming part of the movable drive unit 122, or a separate traction wheel may be provided driven from said motor. In the form shown, the motor 10 is mounted on a turret 127, and drives the traction wheel 126 through a gear reduction unit 131 at one end of a vertical shaft 130, and a gear train 128 at the other end of said shaft. The turret 127 rotates with the drive unit 122 in its steering movement, so that the motor 10 is correspondingly rotated as the traction wheel 126 is moved along the table 121. As the drive unit 122 is steered over the table, it causes the movement of the carriage 120 along its rails, and movement of said unit along said carriage.

One or more torch units 133 are supported on the carriage 120, and are connected to the drive unit 122 by a bar 134 for movement therewith along said carriage and over the plate 135 to be cut, so that the cutting speed of these torch units corresponds to the speed of the traction wheel 126 and its directly connected drive motor 10. These torch units 133 may be of any suitable well-known construction, or may be of the form shown and claimed in Patent 2,336,596, issued on copending application Serial No. 378,102.

The generator 16, which generates the controlling voltage by which the speed of the motor 10 is regulated, is mounted on the turret 127 as shown in Fig. 5 with the armature of said generator connected directly to the armature shaft of the motor 10.

The change in speed of the motor 10 is effected automatically upon the setting of a "cutting calculator" chart device indexed with various plate thicknesses and mounted on carriage 120. This chart per se forms no part of the present invention, but is shown and claimed in copending application Serial No. 386,874, now Patent No. 2,364,644, dated December 21, 1944. This chart device indicates the correct values and adjustments required for each particular thickness of plate being cut with a particular torch tip, and is adjustable to compensate for conditions which influence these values. For that purpose, the chart device comprises a lower stationary chart section 140 (Figs. 6, 7, 8 and 9), and an upper chart section 141 adjustably movable along the upper edge thereof, and provided with a horizontal row of figures indicating plate thicknesses. The lower chart section 140 has a plurality of horizontal tabulations containing cutting data corresponding to respective plate thicknesses indicated in the upper chart section 141. This data may include speed of torch travel in feet per hour, or inches per minute, or feet per second or all three cutting tip sizes, cutting oxygen pressure and cubic feet of cutting oxygen consumed per foot of cut.

The proper cutting speed for a plate of a definite thickness depends on the shape of the cut and various conditions of the plate. For instance, in making cuts having sharp corners, bevels or curves, the speed of the cutting torch should be decreased. If the plate is warm, then the cutting speed should be increased. If cold, it should be decreased, and if the plate has a considerable amount of scale on its surface or is extra clean, the lineal cutting speed should be reduced or increased accordingly.

In order to adjust the chart device for these unusual conditions, there is provided on the upper chart section 141 a scale having an index or pointer 142, and the lower chart section 140 has a scale comprising a main pointer 143 and a series of auxiliary pointers 144 on opposite sides of said main pointer. When the two pointers 142 and 143 are in registry, the chart is set for normal plate conditions. By sliding the upper chart section 141 to effect registry of the pointer 142 with any one of the auxiliary pointers 144 in the lower chart section 140, the chart is corrected for abnormal conditions.

The slidable adjusting movement of the upper chart 141 may be effected through a handle 146 supported on the carriage 120 in accessible position for operation from the front of said carriage and secured to a suitably journalled shaft 145. This shaft 145 carries a forked arm 147 slidably receiving a pin 148 fixed to the upper chart section 141.

An indicator slide 150 is movable across the face of the chart sections 140 and 141 into registry with that figure in the upper chart section 140 indicating the thickness of the plate to be cut, and is desirably in the form of a looped wire, which, when moved into registry with said figure, lines up and encloses the corresponding data in the lower chart section 140.

The movement of the indicator slide 150 across the face of the charts 140, 141 is effected from a hand wheel 151 mounted on the carriage 120 and accessible for operation from the front of said carriage. The transmission between this hand wheel 151 and the slide 150 is shown comprising a bevel gear 152 mounted on the shaft 153 of the handle 151 and meshing with a bevel gear 154 secured to one end of a shaft 155. Near the other end of the shaft 155 is a pinion 156 meshing with a gear 157, which is mounted on the shaft 62. This shaft 62 carries a cable drum 160, the rotation of which is translated into lineal movement of the slide 150 over the charts 140, 141 by means of a cable 161 passing around said drum and over pulleys 162, 163 and 164. A slide block 165 carried by the cable 161 is connected to the upper end of the indicator slide 150, and is guided for slide movement by any suitable means, as, for instance, by the upper edge of a frame plate 166 extending with a free slide fit into a groove in the slide block 165, and forming an inclined backing plate for the charts 140, 141. A spring 167 serves as a take-up for any slack that might develop in the cable 161.

Although the cable is shown partially wound around the drum 160, it may be wound around said drum any number of revolutions. The relative position of the cable 161 with respect to the drum 160 may be fixed against slippage by a screw (not shown) connecting said cable to said drum. Since the drum is made to rotate through a range of less than 360° for the full range of speeds, this fixed connection between the cable and the drum will not interfere with the proper operation of the indicating device.

The stationary contact parts of the three selector units 53, 68 and 75 are desirably formed into a single unit, and for that purpose are shown mounted on a single disc 170, with the three rows of contacts 55, 67 and 76 and the three solid contact rings 54, 70 and 77 concentrically mounted with respect to the axes of the control shaft 62. This speed control adjustment disc 170 is shown mounted on a bracket 171 having a rigid connection to the frame structure of the control housing 172, and has a central aperture to permit the passage of the control shaft 62 therethrough.

The three pairs of rotatable contact arms 60, 61, 71, 72, 78 and 80 are mounted on a disc 173, which is fixed to the gear 157 for rotation therewith by any suitable means, as for instance, the spacer sleeve 174 encircling the shaft 62.

When the hand wheel 151 is turned to set the slide 150 on the chart 140 in accordance with the thickness of the plate to be cut, the control disc 173 is automatically set into proper contact position with the stationary control disc 170 to obtain the proper torch speed for said plate.

In order to insure the stopping of the rotary control disc 173 in proper contact position with respect to the stationary disc 170 for each speed setting, there is provided an index device which is shown comprising a sprocket 176 secured to the shaft 155 and provided with a series of recesses 177 depending on the speed ratio between shafts 155 and 62. A roller 178 carried on a pawl 180 pivoted at 181 is urged against the periphery of the sprocket 176 by a spring 182. When the roller 178 is in one of the cam recesses 177, the slide 150 will be in proper alignment with respect to the charts 140 and 141, and the rotary control disc 173 will be in proper corresponding rotary contact position with respect to the stationary control disc 170. The two shafts 155 and 62 are so geared that successive positioning of the slide 150 will cause the snapping of the indexing roller 178 into successive sprocket recesses 177. The operator can tell when the proper setting has been reached by the feel of the control hand wheel 151, since it turns easily into correct position and offers greater resistance to turning as said hand wheel is moved out of correct position.

All of the control parts of the torch cutting machine are shown either mounted on or enclosed within the housing 172 mounted on the carriage 120 behind the front plate 183 of said carriage. The cartridge 105 containing the electrical parts shown in Fig. 2 rests on the floor of the housing 172, and is desirably provided with a handle 185 at one end to facilitate the insertion or removal of said cartridge into or out of said housing. The cartridge 105 has built therein one section 106a of the plug 106, as for instance, the male section, while the female plug section 106b fixed to the base of the housing 172 is mounted in position to electrically receive the male plug section when said cartridge is slipped into position in said housing.

Figure 8:
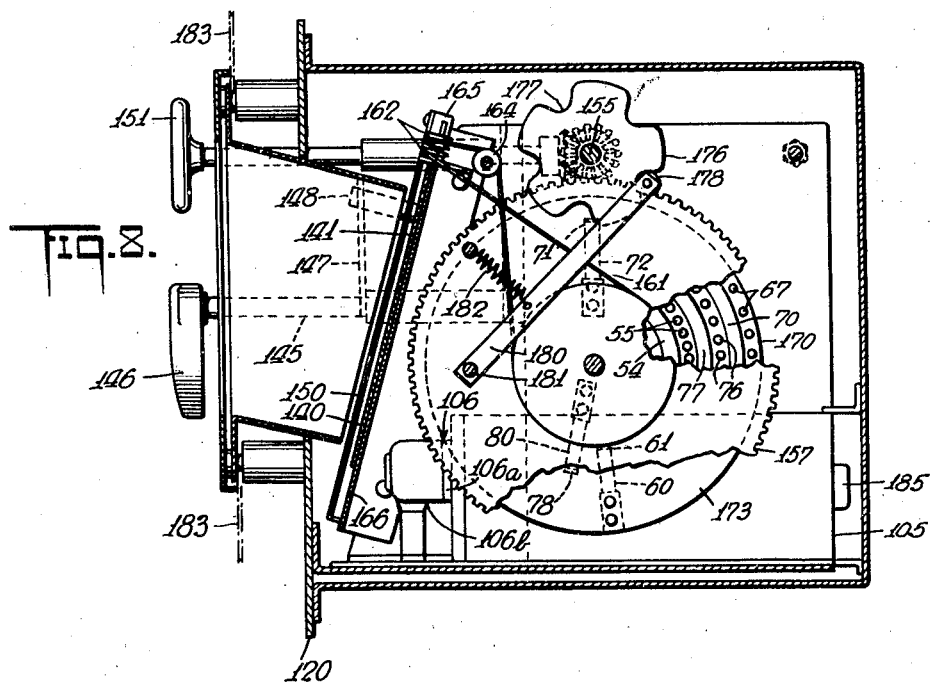
Fig. 8 is a section taken on line 8—8 of Fig. 7.
Figure 9:
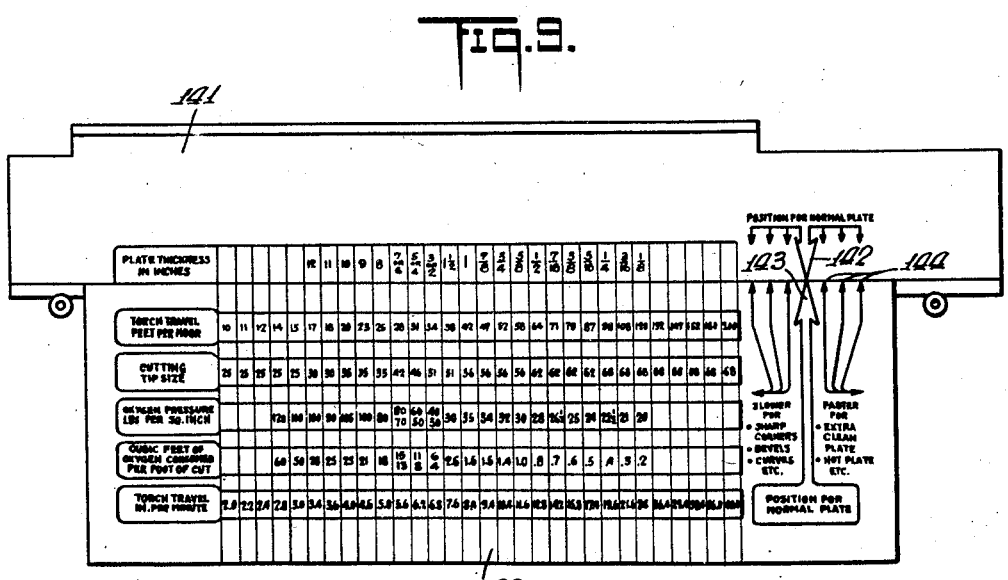
Fig. 9 is a face view of the control chart on the torch cutting machine used in conjunction with the motor speed control device of the present invention.

Although the resistors 23 are not shown in Figs. 6, 7 and 8 for the sake of simplicity and clarity, these are mounted in any suitable position within the housing 172.

As many changes can be made in the above method and apparatus, and many apparently widely different embodiments of this invention can be made without departing from the scope of the claims, it is intended that all matter contained in the above description or shown in the accompanying drawings shall be interpreted as illustrative and not in a limiting sense.

What is claimed is:

1. A speed regulating system for an electric motor, including an electric circuit for delivering electric current at full supply voltage to the motor, an independent circuit having means controling the flow of current in said electric circuit, and including a gas-filled electronic tube having anode and cathode elements in said control circuit and a control grid element, means for impressing upon the control grid element a direct current voltage of constant magnitude and independent of the speed of the motor, and means for also impressing upon said control grid element a voltage, the frequency and magnitude of which vary with the speed of the motor.

2. A speed regulating system for an electric motor, including an electric circuit for delivering electric current at full supply voltage to the motor, an independent circuit having means controlling the flow of current in said electric circuit, and including a gas-filled electronic tube having anode and cathode elements in said control circuit and a control grid element, a battery for impressing upon the control grid element a direct current voltage of constant magnitude, and means for also impressing upon said control grid element a voltage, the frequency and magnitude of which vary with the speed of the motor.

3. In combination, an electric motor of any variable speed type, a generator driven from said motor and generating a voltage depending in value on the speed of said motor, a circuit including a hot gas-filled electronic tube having a cathode, an anode, and a control grid, means for impressing on said grid a direct current voltage of constant magnitude together with a selected proportion of the generated voltage to render said tube conductive when said impressed voltage exceeds a predetermined value, said tube being rendered non-conductive when said voltage drops below said predetermined value, a variable resistance across the output of said generator for selecting said proportion according to the desired motor speed, and means in the circuit of said motor, operated from said tube circuit, to prevent current flow through said motor circuit when said tube becomes conductive, and to permit current flow at full supply voltage in said motor circuit when said tube becomes non-conductive, thereby maintaining said motor at the desired speed.

4. A speed regulating system for an electric motor, including an electric circuit for delivering electric current at full supply voltage to the motor, an independent circuit having means controlling the flow of current in said electric circuit, and including a gas-filled electronic tube having anode and cathode elements in said control circuit and a control grid element, means for impressing upon the control grid element a direct current voltage of constant magnitude and independent of the speed of the motor, and means for also impressing upon said control grid element a selected proportion of a voltage the magnitude of which varies with the speed of the motor.

5. A speed regulating system for an electric motor, including an electric circuit for delivering electric current at full supply voltage to the motor, an independent circuit having means controlling the flow of current in said electric circuit, and including a gas-filled electronic tube having anode and cathode elements in said control circuit and a control grid element, means for impressing upon the control grid element a direct current voltage of constant magnitude and independent of the speed of the motor, and means for also impressing upon said control grid element a selected proportion of a direct current voltage the magnitude of which varies with the speed of the motor.

6. A speed regulating system for an electric motor, including an electric circuit for delivering electric current at full supply voltage to the motor, an independent circuit having means controlling the flow of current in said electric circuit, and including a gas-filled electronic tube having anode and cathode elements in said control circuit and a control grid element, a battery for impressing upon the control grid element a direct current voltage of constant magnitude, and means for also impressing upon said control grid element a selected proportion of a voltage, the magnitude of which varies with the speed of the motor.

7. An apparatus for controlling the speed of an electric motor, comprising a circuit for delivering current at full supply voltage to said motor, means for generating a voltage in direct proportion to the speed of said motor, a potential divider for said generated voltage, means for generating a direct current voltage of constant magnitude, an electronic tube, means for impressing on said electronic tube said direct current voltage and a portion of said first mentioned voltage selected at said potential divider according to the desired speed of said motor, to stop and start current flow through said tube according to variations in said selected voltage, and means for controlling the flow of electric current to said motor in accordance with the flow of current through said tube.

8. An apparatus for controlling the speed of an electric motor, comprising a circuit for delivering current at full supply voltage to said motor, an independent circuit including an electronic tube, means for generating a voltage in direct proportion to the speed of the motor, a potential divider for said voltage, means for generating a direct current voltage of constant magnitude, means for impressing on said electronic tube said direct current voltage and the voltage delivered from said potential divider, and means in said independent circuit for controlling the flow in said first mentioned circuit and thereby controlling the speed of the motor in accordance with the setting of said potential divider.

9. An apparatus for controlling the speed of an electric motor comprising a circuit for delivering full supply voltage current to said motor, means driven by said motor for generating a voltage depending in value upon the speed of said motor, an independent circuit having an electronic tube permitting or cutting off full supply voltage current flow through said first mentioned circuit, means for impressing on said tube a direct current voltage of constant magnitude, means including a potential divider for impressing on said tube a selected proportion of said generated voltage, and means operated in accordance with the setting of said potential divider for varying the current flow to said motor.

CHESTER MOTT.
ALFRED F. CHOUINARD.
ROBERT L. HARDING.

(References on following page)

REFERENCES CITED

The following references are of record in the file of this patent:

UNITED STATES PATENTS

| Number | Name | Date |
|---|---|---|
| 1,353,815 | Meyer | Sept. 15, 1920 |
| 1,358,637 | Herron | Nov. 9, 1920 |
| 1,485,865 | Meyer | Mar. 4, 1924 |
| 1,774,865 | Allison | Sept. 2, 1930 |
| 1,944,756 | Quarles | Jan. 23, 1934 |
| 2,172,313 | Young | Sept. 5, 1939 |
| 2,177,276 | Bucknam | Oct. 24, 1939 |

FOREIGN PATENTS

| Number | Country | Date |
|---|---|---|
| 294,497 | Great Britain | July 23, 1928 |

OTHER REFERENCES

"Handbook for Elec. Engrs.," Pender, First Edition, pages 1078–1079, published 1914 by John Wiley & Sons, New York, N. Y.